(12) United States Patent
Zhang et al.

(10) Patent No.: US 10,954,643 B2
(45) Date of Patent: Mar. 23, 2021

(54) ENERGY-SUPPLY ROTARY INERTIA DRIVER SYSTEM FOR AN OFFSHORE PLATFORM

(71) Applicant: Qingdao University of Technology, Shandong (CN)

(72) Inventors: Chunwei Zhang, Shandong (CN); Hao Wang, Shandong (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 0 days.

(21) Appl. No.: 16/937,509

(22) Filed: Jul. 23, 2020

(65) Prior Publication Data

US 2020/0354913 A1 Nov. 12, 2020

Related U.S. Application Data

(63) Continuation of application No. PCT/CN2019/105644, filed on Sep. 12, 2019.

(30) Foreign Application Priority Data

Feb. 1, 2019 (CN) .......................... 201910103513.8

(51) Int. Cl.
*E02B 17/00* (2006.01)
*F03D 9/25* (2016.01)
(Continued)

(52) U.S. Cl.
CPC .......... *E02B 17/0017* (2013.01); *F03D 9/007* (2013.01); *F03D 9/25* (2016.05);
(Continued)

(58) Field of Classification Search
CPC ......... E02B 17/0017; E02B 2017/0091; F03D 9/25; F03D 13/25; F03D 15/00;
(Continued)

(56) References Cited

U.S. PATENT DOCUMENTS 3,553,968 A * 1/1971 Armistead .......... B63B 35/4413
405/211
4,183,715 A * 1/1980 Ducker ................. F03D 7/0224
416/41
(Continued)

FOREIGN PATENT DOCUMENTS

| CN | 102768493 B | 10/2014 |
|----|-------------|---------|
| CN | 103233529 B | 7/2015 |

(Continued)

*Primary Examiner* — Charles Reid, Jr.

(57) ABSTRACT

An energy-supply rotary inertia driver system for an offshore platform includes an annular fixed plate, an active control module, a wind power generation module and a solar power generation module. The system can monitor a motion state of the offshore platform in real time, and can generate a force through the active control module if necessary to apply a force torque of the offshore platform to further achieve the vibration suppression. Moreover, when the offshore platform is under normal operation, the system can act as an energy supply device via wind and solar power generation to feed electric energy to the active control module and other electrical equipment on the offshore platform when needed.

7 Claims, 6 Drawing Sheets

(51) Int. Cl.
*F03D 13/25* (2016.01)
*F03D 15/00* (2016.01)
*F03D 9/00* (2016.01)
*F16F 7/10* (2006.01)
*H02S 10/12* (2014.01)
*E21B 41/00* (2006.01)

(52) U.S. Cl.
CPC ............ *F03D 13/25* (2016.05); *F03D 15/00* (2016.05); *F16F 7/1011* (2013.01); *E21B 41/00* (2013.01); *F16F 2222/08* (2013.01); *F16F 2230/0047* (2013.01); *F16F 2230/18* (2013.01); *F16F 2232/02* (2013.01); *H02S 10/12* (2014.12)

(58) Field of Classification Search
CPC . F03D 9/007; F03D 9/34; F16F 7/1011; F16F 2222/08; F16F 2230/0047; F16F 2230/18; F16F 2232/02; H02S 10/12; E21B 41/00; Y02E 10/50; Y02E 10/727; Y02E 10/72
USPC ...................... 405/211; 290/44, 55
See application file for complete search history.

(56) References Cited

U.S. PATENT DOCUMENTS

| | | | |
|---|---|---|---|
| 4,389,141 A | 6/1983 | Cumings | |
| 8,918,225 B2* | 12/2014 | Lazaris | H02J 3/382 700/297 |
| 9,347,425 B2* | 5/2016 | Wright | F03D 13/25 |
| 2013/0078039 A1* | 3/2013 | Sun | E02B 17/003 405/211 |
| 2013/0307277 A1* | 11/2013 | Rosenvard | F03D 13/25 290/55 |
| 2014/0015255 A1* | 1/2014 | Schellstede | E02D 27/425 290/55 |

FOREIGN PATENT DOCUMENTS

| | | |
|---|---|---|
| CN | 103277454 B | 5/2016 |
| FR | 2607843 B1 | 3/1989 |

\* cited by examiner

ENERGY-SUPPLY ROTARY INERTIA DRIVER SYSTEM FOR AN OFFSHORE PLATFORM

CROSS-REFERENCE TO RELATED APPLICATIONS

This application is a continuation of International Patent Application No. PCT/CN2019/105644 with a filing date of Dec. 9, 2019, which claims the benefit of priority from Chinese Patent Application No. 201910103513.8 with a filing date of Feb. 1, 2019. The content of the aforementioned applications, including any intervening amendments thereto, is incorporated herein by reference.

TECHNICAL FIELD

The present application relates to vibration suppression in the system, and more particularly to an energy-supply rotary inertia driver system for an offshore platform.

BACKGROUND

With the implementation of "Sea Power" strategy, large-scale marine equipment such as offshore platforms and heavy ships has been continuously built, and the construction techniques of the offshore platforms also receive rapid development. The offshore platform is an important structure that provides production and living facilities for drilling, oil production, transportation, observation, navigation and construction, so its security and stability must be fully considered during the design stage. In addition, the offshore platform often undergoes vibration in use under the action of an external load, and if the external load is large enough, a swing and even destruction may occur. In order to avoid various problems caused by structural vibration, the vibration control technology has been developed. The vibration control technology is mainly divided into active control, passive control, semi-active control and hybrid control. For a given structure, the installation of an appropriate vibration control device can effectively reduce the dynamic response of the structure, alleviating the destruction or fatigue damage caused by the vibration to the structure.

However, the movement of a structure is usually a combination of translation and torsion vibration. It has been found that the control device such as a translational tuned mass damper, an active mass damper (AMD) and an active torque output device, due to the need to provide a centripetal force in the torsion vibration, is greatly weakened in the control effect on the controlled structure, and even completely loses its function, failing to effectively control the swing vibrations. There are many motion forms involving the swing vibration, such as the torsion vibration of the offshore platform under the coupling effect of wave, wind and ice; the swing of a suspended structure; the torsion vibration of irregular buildings under the wind load; the torsion vibration caused by position adjustment and opening of a solar panel during the operation of a spacecraft and a space structure; and the torsion vibration in a high-speed train due to small excitations. Therefore, it is required to design a special control device, which overcomes (or gets rid of) the influence of the gravity field on the control device itself (effect of centrifugal force), or decoupling its work/motion law from the gravity field so that the natural vibration would not be affected by gravity, providing an effective control.

At present, the vibration isolation is the most commonly-used vibration control technology for offshore platforms, in which an isolation layer is appropriately provided in the offshore platform structure to reduce the response of a superstructure of the offshore platform. However, the vibration isolation can merely provide limited control for vibration, particularly for swing vibration. Moreover, the employment of a tuned liquid damper still has some defects such as unsatisfactory control effect, failure in control of the swing vibration and complicated installation. Though the existing active control device can exert a desirable control effect in most cases, it still fails to be applied in the offshore platform structure due to the limitation in energy supply.

In summary, though the vibration control device plays an indispensable role in the offshore platforms, it still remains to be improved to overcome the following shortcomings.

(1) The existing vibration isolation technology in the offshore platforms has limited control effects and a complicated design.

(2) For the offshore platforms, the existing control devices such as TMD, TLD and AMD can only control the translation, but fails to control the swing vibrations.

(3) The passive rotary inertia tuned damper can effectively control the swing vibration, but it requires complex frequency modulation for the structure itself, moreover, for some complicated structures, it has the disadvantages of low efficiency, poor effect, low robustness, low controllability and small application range.

(4) The traditional active control devices can control the swing vibrations, but the control efficiency is extremely low, failing to meet the practical requirements. Besides, the active control devices can not guarantee the energy supply when used under complex working conditions, such as in the offshore platforms.

SUMMARY

An object of the disclosure is to provide an energy-supply rotary inertia driver system for an offshore platform to solve the problems in the prior art that the traditional TMD, TLD or AMD fails to control the swing vibration with high efficiency and desirable effect; the passive tuned rotary inertia damper control has low robustness, complex frequency modulation and narrow application; and the traditional active control device cannot guarantee energy supply.

The technical solutions of the disclosure are described as follows.

The present disclosure provides an energy-supply rotary inertia driver system for an offshore platform, comprising:
 an annular fixed plate;
 an active control module;
 a wind power generation module; and
 a solar power generation module;
 wherein a mounting plate is provided on an inner side of the annular fixed plate to fix the annular fixed plate to a periphery of the offshore platform; the annular fixed plate is provided with a guide rail; the active control module matches with the guide rail for a free movement of the active control module in the guide rail;
 the active control module comprises a drive, a transmission, a fixed base, a rotating shaft, a rotating wheel and an electromagnetic slider; wherein a lower end of the fixed base is connected to the electromagnetic slider, and the electromagnetic slider is matched with the guide rail in shape; the drive is fixed on the fixed base; the transmission is arranged at an end of the drive facing toward the rotating wheel; and the transmission is connected to the rotating wheel through the rotating shaft in a transmission way;

the wind power generation module comprises a generator, a connecting shaft, a first clutch sheet and a second clutch sheet, wherein the wind power generation module is provided between the transmission and the rotating wheel; the generator is fixed on the fixed base; a retractable shaft is provided on a side of the generator opposite to the transmission, and the second clutch sheet is arranged at an end of the retractable shaft away from the generator; a side of the generator away from the transmission is connected to the rotating wheel through the connecting shaft, and an end of the rotating shaft facing toward the rotating wheel is provided with the first clutch sheet; connection and disconnection between the first clutch sheet and the second clutch sheet is realized by expansion and contraction of the retractable shaft;

the solar power generation module comprises a bracket and a solar panel; wherein the solar panel is fixed to the fixed base through the bracket; the bracket comprises four props which are respectively fixed to four corners of the solar panel; two props close to the rotating wheel are hinged to the solar panel, and a telescopic cylinder is respectively provided at a bottom of the other two props away from the rotating wheel.

In an embodiment, a permanent magnet and a first coil are provided in the guide rail; a second coil is provided in the electromagnetic slider; the second coil in the electromagnetic slider cooperates with the permanent magnet and the first coil in the guide rail for a free movement of the electromagnetic slider in the guide rail.

In an embodiment, the drive is a servo motor or a stepper motor.

In an embodiment, a rotating plane of the rotating wheel is perpendicular to a mounting plane of the fixed base, and an axis of the rotating shaft is perpendicular to the rotating plane of the rotating wheel.

In an embodiment, the transmission is a speed reducer.

In an embodiment, an encoder is arranged at an end of the drive away from the rotating wheel, wherein the encoder is coaxially arranged with the drive and the transmission; and a sensor is provided on the offshore platform for collecting vibration response data of the offshore platform.

In an embodiment, the system further comprises a controller, wherein the controller is electrically connected to the encoder, the sensor and the drive, respectively; the controller receives signals from the encoder and the sensor, and transmits the signals to the drive to enable control for a rotation direction and a rotation speed of the rotation wheel.

Compared to the prior art, the invention has the following beneficial effects.

The energy-supply rotary inertia driver system for an offshore platform provided herein can realize the suppression of all-round vibration response by employing an active control module. Specifically, the active control module can move freely to suppress the vibration response in any direction. Besides, the system has a stable structure, facilitating the application in an environment with poor working conditions such as ocean.

The active control device provided herein has greater robustness, and significant suppression effect on the vibration. Besides, the suppression effect is not prone to the effect brought by the changes in structural form and external load, which ensures the security and stability of the offshore platform to the maximum extent.

The system adopts a dual energy supply guarantee mechanism, in which a wind power generation module and a solar power generation module are provided to generate and store energy, thereby feeding power to the system itself and other electrical equipment on the offshore platform. Therefore, the system can be applied to complex marine environments.

1, annular fixed plate; 11, mounting plate; 12, guide rail; 121, high-strength permanent magnet; 122, first coil; 2, offshore platform; 21, sensor; 3, active control module; 31, drive; 32, fixed base; 33, rotating shaft; 34, rotating wheel; 35, electromagnetic slider; 351, second coil; 4, wind power generation module; 41, generator; 42, connecting shaft; 43, first clutch sheet; 44, second clutch sheet; 45, retractable shaft; 5, solar power generation module; 51, bracket; 511, prop; 512, telescopic cylinder; 52, solar panel; 6, encoder; 7, transmission; 8, controller.

DETAILED DESCRIPTION OF EMBODIMENTS

The present disclosure will be further described in detail below with reference to the accompanying drawings.

Embodiment 1

Due to the particularity of the installation position, the offshore platform will suffer a vibration response under the impact of waves and wind, where the vibration response can be roughly simplified to torsion response and swing vibration response. Moreover, since the installation location of the offshore platform is far away from the land, there will be great limitation in the power supply. Considering the two forms of vibration responses and the limitation in the power supply, the present disclosure provides an energy-supply rotary inertia driver system for an offshore platform.

Figure 2:
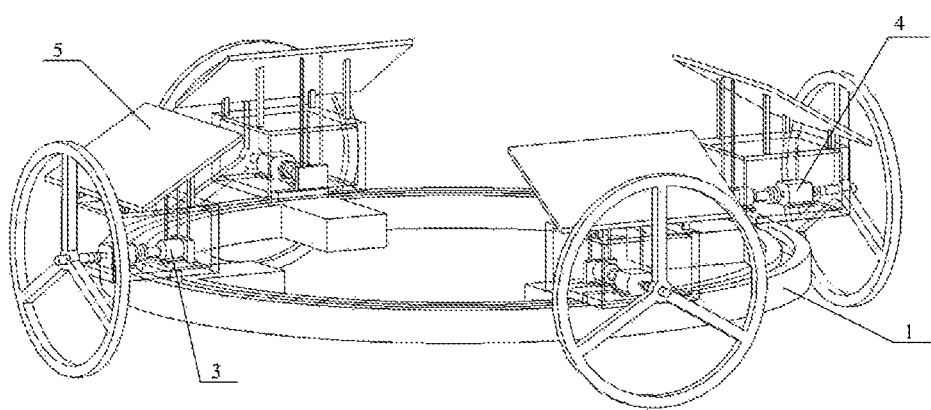
FIG. 2 is a schematic diagram of the energy-supply rotary inertia driver for the offshore platform according to the embodiment of the present disclosure.

As shown in FIG. 2, the present disclosure provides an energy-supply rotary inertia driver system for an offshore platform, including a annular fixed plate 1, an active control module 3, a wind power generation module 4 and a solar power generation module 5;

where the annular fixed plate 1, the active control module 3, the wind power generation module 4 and the solar power generation module 5 are together defined as an assembly herein.

Figure 3:
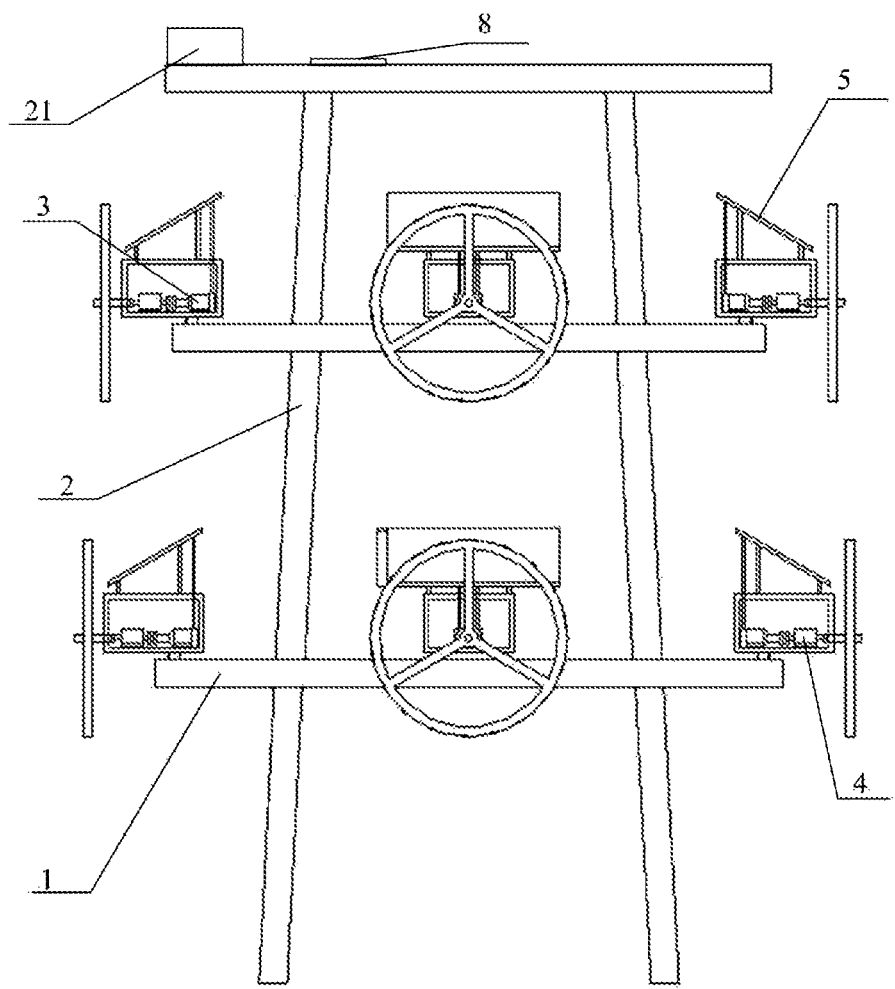
FIG. 3 is a front view of the energy-supply rotary inertia driver for the offshore platform in use according to the embodiment of the present disclosure.
Figure 4:
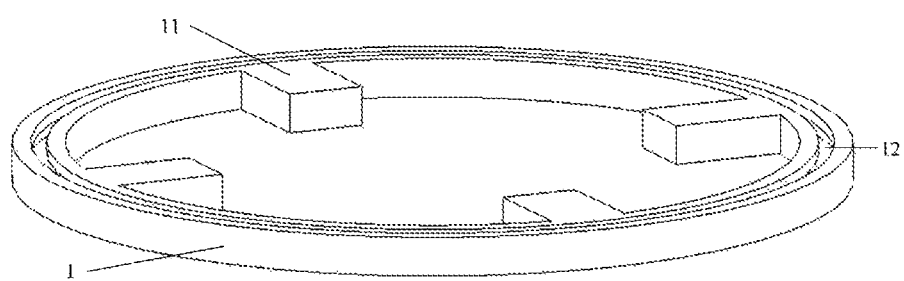
FIG. 4 is a schematic diagram of an annular fixed plate of the energy-supply rotary inertia driver system for the offshore platform according to the embodiment of the present disclosure.
Figure 5:
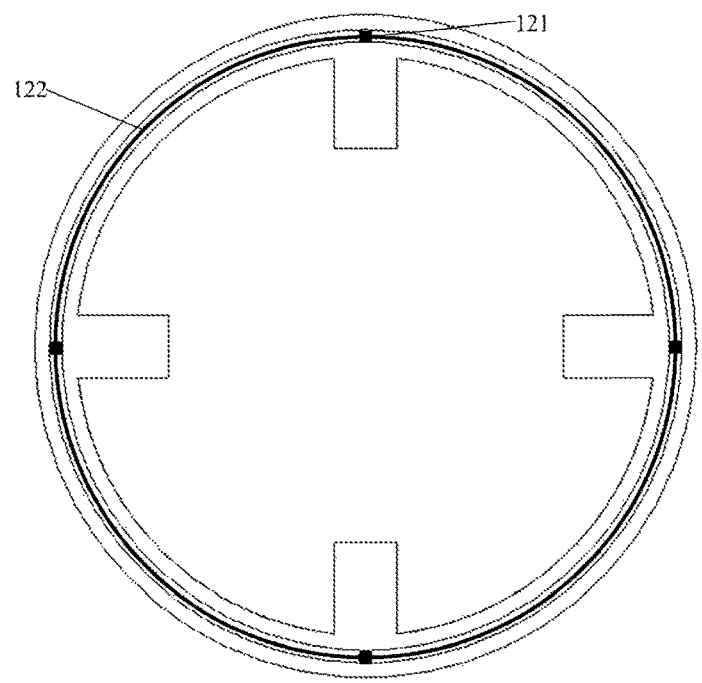
FIG. 5 is a top view of the annular fixed plate of the energy-supply rotary inertia driver system for the offshore platform according to the embodiment of the present disclosure.

As shown in FIGS. 3-4, a mounting plate 11 is provided on an inner side of the annular fixed plate 1 to fix the annular fixed plate 1 to a periphery of the offshore platform 2. The annular fixed plate 1 is provided with a guide rail 12; the active control module 3 matches with the guide rail 12 for a free movement of the active control module 3 in the guide rail 12.

Figure 1:
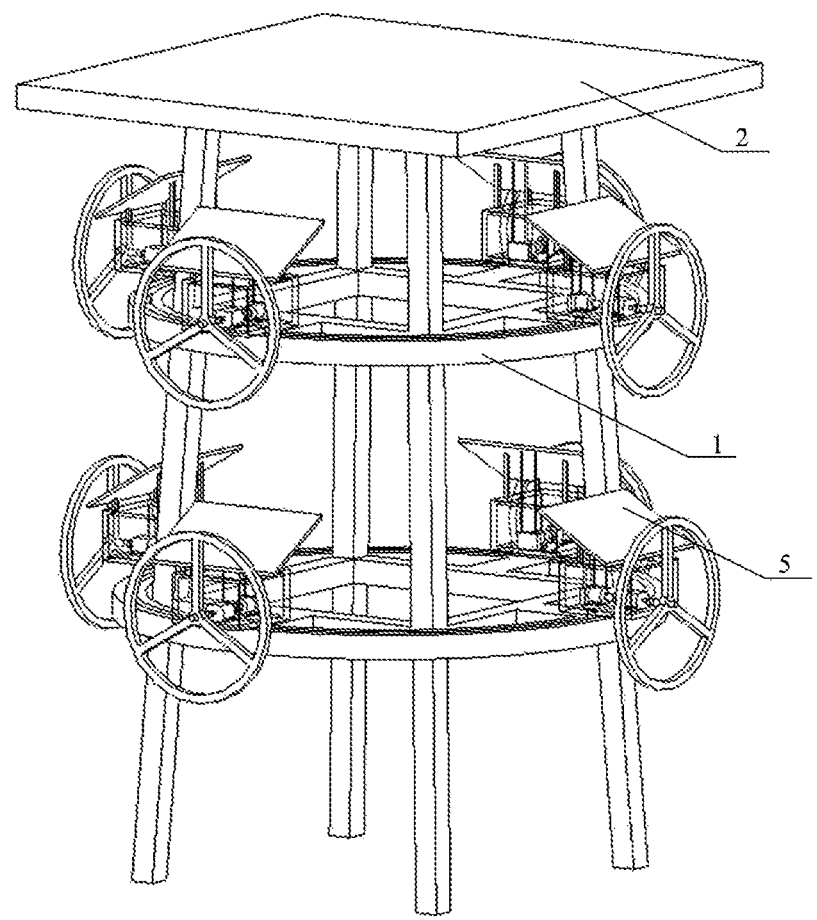
FIG. 1 is a perspective view of an energy-supply rotary inertia driver system for an offshore platform in use according to an embodiment of the present disclosure.

As shown in FIGS. 1-2, the energy-supply rotary inertia driver system in this embodiment is divided into an upper assembly and a lower assembly, which are arranged on an on-water structure of the offshore platform 2, where each of the assemblies is composed of four active control modules 3, four wind power generation modules 4, four solar power generation modules 5 and an annular fixed plate 1. Each of the active control modules 3 moves around at an angle of no more than 45 degrees, and the four active control modules 3 in each of the assemblies work together.

As shown in FIGS. 3-5 and 7, the active control module 3 includes a drive 31, a transmission 7, a fixed base 32, a rotating shaft 33, a rotating wheel 34 and an electromagnetic slider 35, where a lower end of the fixed base 32 is connected with the electromagnetic slider 35, and the electromagnetic slider 35 is matched with the guide rail 12 in shape. A high-strength permanent magnet 121 and a first coil 122 are provided in the guide rail 12, and a second coil 351 is provided in the electromagnetic slider 35. The second coil 351 in the electromagnetic slider 35 cooperates with the high-strength permanent magnet 121 and the first coil 122 in the guide rail 12 for a free movement of the electromagnetic slider 35 in the guide rail 12. The motion control described in this section is performed based on the basic principle of the linear motor, which belongs to the prior art and will not be further repeated here. The drive 31 is fixed on the fixed base 32. The transmission 7 is arranged at an end of the drive 31 facing toward the rotating wheel 34, and is connected to the rotating wheel 34 via the rotating shaft 33 in a transmission way. The transmission 7 is a speed reducer.

Figure 7:
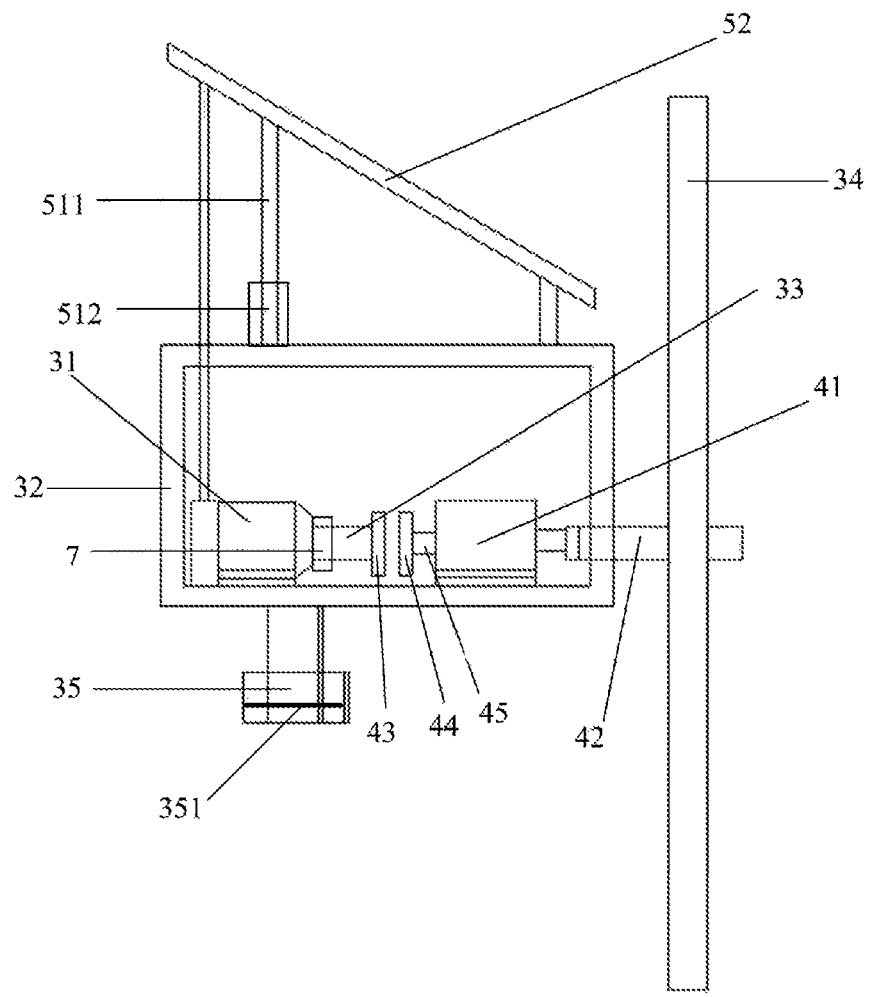
FIG. 7 is a front view of the active control module, the wind power generation module and the solar power generation module of the energy-supply rotary inertia driver system for the offshore platform according to the embodiment of the present disclosure.

As shown in FIGS. 3 and 7, the wind power generation module 4 includes a generator 41, a connecting shaft 42, a first clutch sheet 43 and a second clutch sheet 44. The wind power generation module 4 is provided between the transmission 7 and the rotating wheel 34. The generator 41 is fixed on a fixed base 32. A retractable shaft 45 is provided on a side of the generator 41 opposite to the transmission 7, and the second clutch sheet 44 is arranged at an end of the retractable shaft 45 away from the generator. A side of the generator 41 away from the transmission 7 is connected to the rotating wheel 34 through the connecting shaft 42, and an end of the rotating shaft 33 away from the transmission 7 is provided with the first clutch sheet 43; connection and disconnection between the first clutch sheet 43 and the second clutch sheet 44 is realized through expansion and contraction of the retractable shaft 45.

As shown in FIGS. 3 and 7, the wind power generation module 4 cooperates with the active control module 3 through the connection and disconnection between the first clutch sheet 43 and the second clutch sheet 44. When the first clutch sheet 43 and the second clutch sheet 44 are connected, the active control module 3 works to drive the connecting shaft 42 of the wind power generation module 4 to alternately rotate in two opposite directions around an axial direction of the connecting shaft 42, so that the rotating wheel 34 connected to the connecting shaft 42 is driven to alternately rotate in two opposite directions around the axial direction of the connecting shaft 42 to produce a suppression effect on the vibration of the offshore platform 2. When the retractable shaft 45 is contracted to separate the first clutch sheet 43 from the second clutch sheet 44, the rotating wheel 34 is driven by external wind to rotate in the same direction around its axial direction to drive the generator 41 to generate electrical energy.

As shown in FIGS. 3 and 7, the solar power generation module 5 includes a bracket 51 and a solar cell panel 52, where the solar panel 52 is fixed to the fixed base 32 through the bracket 51. The bracket includes four props 511 which are respectively fixed to four corners of the solar panel 52, where two props 511 close to the rotating wheel are hinged to the solar panel 52, a telescopic cylinder 512 is respectively provided at a bottom of the other two props away from the rotating wheel. The tilt angle of the solar panel 52 can be adjusted through the extension and contraction of the telescopic cylinder 512 to enable the solar panel 52 to absorb the solar energy to the maximum extent, and to continuously store energy.

As shown in FIG. 7, the drive 31 is a servo motor or a stepper motor.

A rotating plane of the rotating wheel 34 is perpendicular to a mounting plane of the fixed base 32, and an axial direction of the rotating shaft 33 is perpendicular to the rotating plane of the rotating wheel 34.

Figure 6:
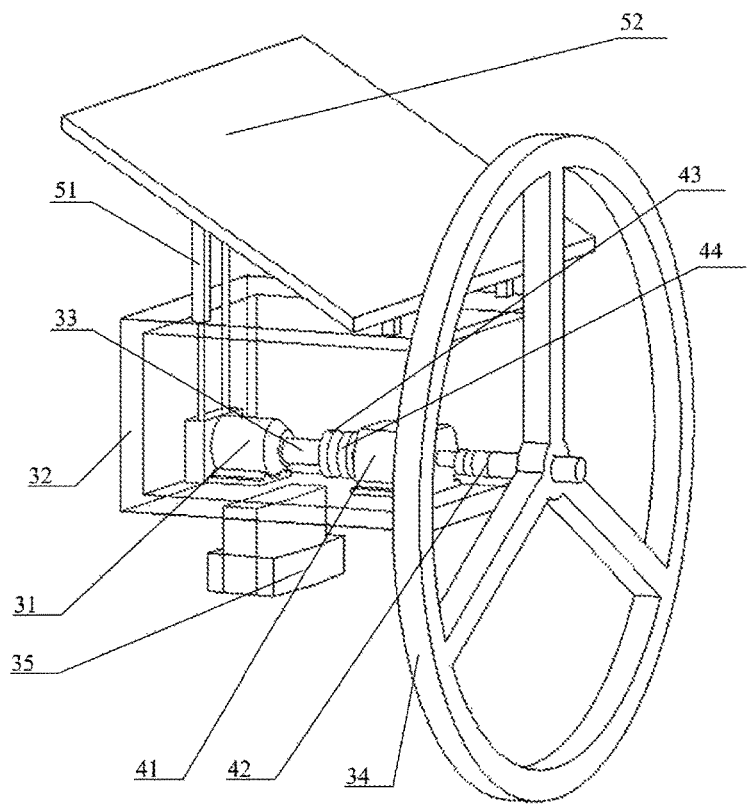
FIG. 6 is a perspective view of an active control module, a wind power generation module and a solar power generation module of the energy-supply rotary inertia driver system for the offshore platform according to the embodiment of the present disclosure.
Figure 8:
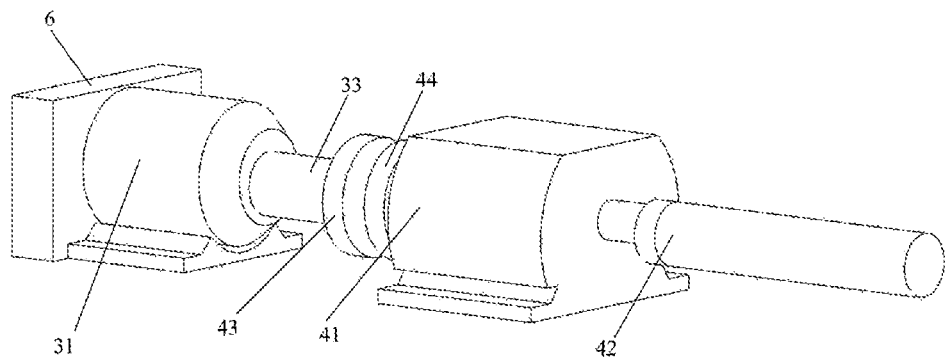
FIG. 8 is a schematic diagram showing a connection between a drive and a generator of the energy-supply rotary inertia driver system for the offshore platform according to the embodiment of the present disclosure.

As shown in FIGS. 6-8, an encoder 6 is arranged at an end of the drive 31 away from the rotating wheel 34, where the encoder 6 is coaxially arranged with the drive 31 and the transmission 7. A sensor 21 is arranged on the offshore platform 2 for detecting vibration response data of the offshore platform 2.

As shown in FIGS. 3 and 7-8, the energy-supply rotary inertia driver system further includes a controller 8, where the controller 8 is electrically connected to the encoder 6, the sensor 21 and the drive 31, and is used for receiving signals from the encoder 6 and the sensor 21, and transmitting the signals to the drive 31. The active control module 3 can raise a response and adjust the position of the rotating wheel 34 to render the plane of the rotating wheel 34 consistent with a direction of the main vibration response of the offshore platform 2. Therefore, the active control module 3 controls the drive 31 to adjust and further control the rotation direction and rotation speed of the rotating wheel 34. The force generated from the alternate rotation of the rotating wheel 34 in two opposite directions around the axial direction of the connecting shaft 42 is applied on the fixed base 32, and further applied on the offshore platform 2 through the annular fixed plate 1, so that the rotating wheel 34 can suppress the vibration response of the offshore platform 2 on a plane which coincides with the rotation plane of the rotating wheel 34.

As shown in FIG. 3, the offshore platform 2 may also experience a vortex in the ocean and a torsion response along a center of the offshore platform 2 will occur. The controller 8 controls the movement state of the active control module 3 on the annular fixed plate 1, thereby applying a control force to the offshore platform 2. The control force generates a torque in the opposite direction to the torsion of the offshore platform 2 to suppress the torsion response, providing a suppression effect on the offshore platform 2.

As shown in FIGS. 3-4 and 7, when a swing vibration response occurs in the offshore platform 2, the sensor 21 arranged on the offshore platform 2 transmits the information to the controller 8, and the controller 8 sends a signal to drive the retractable shaft 45 to extend, so that the first clutch sheet 43 and the second clutch sheet 44 are connected with each other. The drive 31 in the active control module 3 works to indirectly drive the connecting shaft 42 to rotate alternately in two opposite directions around the axis of the connecting shaft 42, so that the rotating wheel 34 is driven to alternately in two opposite directions around the axial direction of the connecting shaft 42, thereby producing a force to suppress the swing vibration response on the offshore platform 2. The force is transmitted to the guide rail 12 through the fixed base 32, and applied on the offshore platform 2 through the annular fixed plate 1, so that the rotating wheel 34 can move freely in the guide rail 12 through the electromagnetic slider 35, actively suppressing the swing vibration response in various directions of the offshore platform 2.

Embodiment 2

Figure 9:
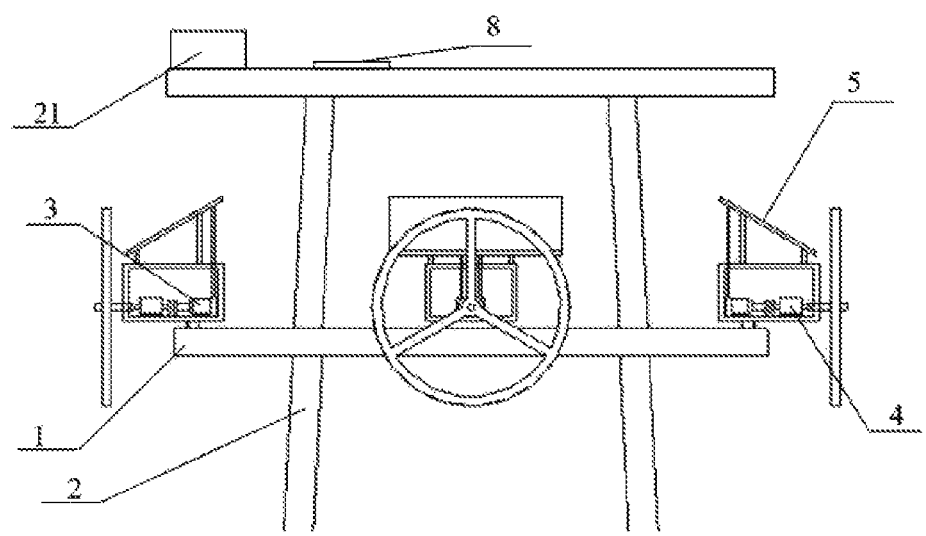
FIG. 9 is a front view of the energy-supply rotary inertia driver system for the offshore platform in use according to another embodiment of the present disclosure.

As shown in FIG. 9, in this embodiment, the energy-supply rotary inertia driver system only has one assembly, and is arranged on an on-water structure of the offshore platform 2, where the assembly is composed of one active control module 3, one wind power generation module 4, one solar power generation module 5 and one annular fixed plate 1; and other details are the same as those in Embodiment 1.

The number of the active control modules 3 arranged on the annular fixed plate 1 and the number of the annular fixed plates 1 fixed on the offshore platform 2 can be changed according to the environmental conditions of the actual sea area where the offshore platform 2 is located.

The operation process of the present disclosure is described as follows.

As shown in FIGS. 7 and 9, the offshore platform 2 is provided with a sensor 21 to collect the vibration response data of the offshore platform 2 and transmit the response data to the controller 8. The controller 8 determines whether it is required to perform active control on the offshore platform 2. When the vibration response data exceeds a preset threshold of the controller 8, the controller 8 controls the drive 31 to operate, and the retractable shaft 45 extends to drive the second clutch sheet 44 to connect with the first clutch sheet 43. The drive 31 is connected to the rotating wheel 34 in a transmission way to control the rotating wheel 34 to alternately rotate in two opposite directions around the axial direction of the connecting shaft 42. The force generated by the rotating wheel 34 is applied on the annular fixed plate 1, and then transmitted to the offshore platform 2 connected to the annular fixed plate 1, suppressing the swing vibration response of the offshore platform 2. The force generated by the rotating wheel 34 is used for suppressing the vibration response of the offshore platform 2 in the plane where the rotating wheel 34 is located. Specifically, the vibration response data of the offshore platform 2 is collected in real time by the sensor 21, including the rotation direction and the rotation speed of the rotating wheel 34 controlled by the drive 31, adjusting the force applied on the offshore platform 2 and the output of the drive 31 to further suppress the vibration response of the offshore platform 2. This embodiment can ensure that the active control module 3 provides a good suppression effect on the vibration response of the offshore platform 2.

As shown in FIGS. 4 and 7-9, after the vibration response of the offshore platform 2 in the plane where the rotating wheel 34 is located is suppressed, the electromagnetic slider 35 moves in the guide rail 12 according to the vibration response data collected by the sensor 21 to suppress the vibration response of the offshore platform 2 in other directions. After the vibration response of the offshore platform 2 is suppressed, the encoder 6 transmits the signal that the vibration response is suppressed to the controller 8, and the controller 8 controls the retractable shaft 45 to contract to drive the second clutch sheet 44 to be separated from the first clutch sheet 43, so that the active control module 3 stops moving.

As shown in FIGS. 7 and 9, the wind power generation module 4 operates to convert the energy of the rotation of the rotating wheel 34 in the same direction around the axial direction of the rotating wheel 34 under the action of external wind into electrical energy and store the electric energy. In addition, the telescopic cylinder 512 on the solar power generation module 5 can extend and contract to change a tilt angle of the solar panel 52 to enable the solar panel 52 to absorb the solar energy to the maximum extent and to continuously generate the electric energy. The electric energy generated by the solar power generation module 5 and the wind power generation module 4 is transmitted to an energy storage device through a wire. The electrical energy is not only used for the operation of the active control module 3, but also used for other electrical equipment on the offshore platform 2.

Described above are only preferred embodiments of the present disclosure, which are not intended to limit the present disclosure. It should be noted that any equivalent change and improvement made by those skilled in the art without departing from the spirit of the present disclosure shall fall within the scope of the disclosure defined by the appended claims.

What is claimed is:

1. An energy-supply rotary inertia driver system for an offshore platform, comprising:
   an annular fixed plate;
   an active control module;
   a wind power generation module; and
   a solar power generation module;
   wherein a mounting plate is provided on an inner side of the annular fixed plate to fix the annular fixed plate to a periphery of the offshore platform; the annular fixed plate is provided with a guide rail; the active control module matches with the guide rail for a free movement of the active control module in the guide rail;
   the active control module comprises a drive, a transmission, a fixed base, a rotating shaft, a rotating wheel and an electromagnetic slider; wherein a lower end of the fixed base is connected to the electromagnetic slider; the electromagnetic slider is matched with the guide rail in shape; the drive is fixed on the fixed base; the transmission is arranged at an end of the drive facing toward the rotating wheel; and the transmission is connected to the rotating wheel via the rotating shaft in a transmission way;
   the wind power generation module comprises a generator, a connecting shaft, a first clutch sheet and a second clutch sheet, wherein the wind power generation module is provided between the transmission and the rotating wheel; the generator is fixed on the fixed base; a retractable shaft is provided on a side of the generator opposite to the transmission, and the second clutch sheet is arranged at an end of the retractable shaft away from the generator; a side of the generator away from the transmission is connected to the rotating wheel through the connecting shaft, and an end of the rotating shaft facing toward the rotating wheel is provided with the first clutch sheet; connection and disconnection between the first clutch sheet and the second clutch sheet is realized by expansion and contraction of the retractable shaft;

the solar power generation module comprises a bracket and a solar panel; wherein the solar panel is fixed to the fixed base through the bracket; the bracket comprises four props which are respectively fixed to four corners of the solar panel; two props close to the rotating wheel are hinged to the solar panel, and a telescopic cylinder is respectively provided at a bottom of the other two props away from the rotating wheel.

2. The energy-supply rotary inertia driver system of claim 1, wherein a permanent magnet and a first coil are provided in the guide rail; a second coil is provided in the electromagnetic slider; the second coil in the electromagnetic slider cooperates with the permanent magnet and the first coil in the guide rail for a free movement of the electromagnetic slider in the guide rail.

3. The energy-supply rotary inertia driver system of claim 1, wherein the drive is a servo motor or a stepper motor.

4. The energy-supply rotary inertia driver system of claim 1, wherein a rotating plane of the rotating wheel is perpendicular to a mounting plane of the fixed base, and an axis of the rotating shaft is perpendicular to the rotating plane of the rotating wheel.

5. The energy-supply rotary inertia driver system of claim 1, wherein the transmission is a speed reducer.

6. The energy-supply rotary inertia driver system of claim 1, wherein an encoder is arranged at an end of the drive away from the rotating wheel; the encoder is coaxially arranged with the drive and the transmission; and a sensor is provided on the offshore platform for collecting vibration response data of the offshore platform.

7. The energy-supply rotary inertia driver system of claim 6, further comprising a controller;
wherein the controller is electrically connected to the encoder, the sensor and the drive, respectively; the controller receives signals from the encoder and the sensor, and transmits the signals to the drive to enable control for a rotation direction and a rotation speed of the rotation wheel.

\* \* \* \* \*